United States Patent [19]

Akkerman

[11] Patent Number: 4,477,104
[45] Date of Patent: Oct. 16, 1984

[54] RELEASABLE LATCHING APPARATUS

[75] Inventor: Neil H. Akkerman, Kingwood, Tex.

[73] Assignee: AVA International Corporation, Houston, Tex.

[21] Appl. No.: 225,395

[22] Filed: Jan. 15, 1981

[51] Int. Cl.³ .............................................. F16L 21/02
[52] U.S. Cl. ..................................... 285/18; 285/319;
285/94; 166/124; 277/207 A
[58] Field of Search ........................... 285/319, 18, 94;
166/124, 125

[56] References Cited

U.S. PATENT DOCUMENTS

| | | | |
|---|---|---|---|
| 2,027,653 | 1/1936 | Roye | 285/94 |
| 3,023,030 | 2/1962 | Torres | 285/18 |
| 3,041,089 | 6/1962 | Purves | 285/94 |
| 3,222,088 | 12/1965 | Haeber | 285/18 |
| 3,492,027 | 1/1970 | Herring | 285/18 |
| 3,499,665 | 3/1970 | Conrad | 285/18 X |
| 3,912,009 | 10/1975 | Davis, Jr. | 285/319 X |

Primary Examiner—Thomas F. Callaghan
Attorney, Agent, or Firm—Vaden, Eickenroht, Thompson, Bednar & Jamison

[57] ABSTRACT

There are disclosed two embodiments of an apparatus for releasably latching the lower end of a tubing string within the bore of an upstanding well conduit by means of latching parts adapted to be received in latching position beneath a shoulder in the bore of the well conduit. The latching parts are locked in latching position by locking means which is engageable and releasable in response to manipulation of the well string. The latching parts are moved into unlatching position, upon release of the locking means, without necessity of sliding contact between the latching parts and the shoulder. There are also disclosed two embodiments of a seal ring clamped within a groove about a stinger portion of the apparatus for sealably engaging the bore of the well conduit.

28 Claims, 14 Drawing Figures

RELEASABLE LATCHING APPARATUS

This invention relates generally to apparatus for releasably latching the end of one member in telescoping relation with respect to the end of another member. More particularly, this invention relates to improvements in apparatus of this type wherein the end of the other member is prepared to receive latches which are carried on the telescoping end of the one member for movement between latching and unlatching positions in response to manipulation of the one member. In this respect, the invention has particular utility in releasably latching the lower end of a tubing string to the upper end of an upstanding well conduit in response to manipulation of the string at the head of the well. In another of its aspects, this invention relates to improvements in a sealed joint between the ends of the tubing string and well conduit, or other members to be latched in telescoping relation.

In one such latching apparatus, the bore of the well conduit has threads which are adapted to receive threads on fingers which are carried by the tubing string. The fingers are spring-pressed outwardly so that they ratchet over the threads on the bore of the well conduit, as the lower end of the string is lowered into telescoping relation within the bore. Thus, the fingers prevent the string from being raised from the well conduit unless and until they are unscrewed from the threads by the application of torque to the string at the wellhead while the string is held in tension to prevent its weight from causing the teeth to accidentally ratchet downwardly over the teeth in the well conduit.

In another such apparatus of this type, the bore of the well conduit is prepared with a "J" slot having a first generally vertical channel to receive a pin on the tubing string as the lower end of the string is lowered into telescoping relation within the bore, and a second upwardly extending channel having a lower end connected to the lower end of the first channel. Thus, when lowered into the lower end of the first channel, the string is rotated to move the pin laterally into the lower end of the second channel and then lifted to raise the pin into the upper end of the second channel in order to prevent the string from being raised from the well conduit. To retrieve the string, its weight is slacked off to move the pin back into the lower end of the second channel and torque is applied thereto to move the pin laterally into the lower end of the first channel, whereby tension may be applied to the string to lift the pin out of the slot.

One advantage to each such apparatus is that the latching parts, upon release, may be relatched to the well conduit without pulling the tubing string from the well bore for the purpose of replacing the latching part thereon. However, in each case, the need for sliding the latching part on the tubing string laterally over a surface of the latching part on the conduit bore, while the one member on which the string is either held in tension or its weight is slacked off, requires that the surface on the bore be kept smooth and clean. This is difficult in view of the environment in which such apparatus is used during the completion or workover of a well. For example, tools which are run into and out of the well during completion and workover processes may severely damage the surface and/or drilling mud and other debris in the well may accumulate on it.

In latching apparatus of this type, or other apparatus having sealed telescoping members, seals have been assembled and retained on one such member only with considerable effort and expense. For example, because pressure differential across a seal ring as the one member is moved into or out of telescoping relation may pull a conventional chevron type packing out of its groove formed in the one member, it is often necessary to bond the packing to the groove. Alternatively, chevron packing may be retained on a reduced diameter portion of such one member by means of a nut threaded onto its end. This, however, not only requires the fabrication of two, threadedly connected parts, but also that such parts be sealed to one another, thus creating a further source of potential failure.

The primary object of this invention is to provide latching apparatus of this general type wherein one member may be retrieved from the other member without sliding contact between latching parts on the members, and thus without the requirement that a surface of the latching part on the other member be protected from damage and/or debris.

Another object is to provide such apparatus wherein, as in prior apparatus of this type, the one member may be repeatedly latched and unlatched with respect to the other member, such that, in the case of a well installation, a tubing string may be repeatedly latched and relatched with respect to a well conduit without having to pull the string to replace the latching part thereon.

Still another object is to provide such apparatus in which the latching part on the other member is of such construction that it will receive the latching part on the one member whether, in one embodiment, such parts are released in response to slacking off of the one member, or, in another embodiment, they are released in response to the application of tension thereto.

A further object is to provide a sealed telescopic joint for use with the telescoping members of the above-described latching apparatus, or for use with other telescoping members, in which seals may be assembled and retained on one such member in a simple and inexpensive manner.

These and other objects are accomplished, in accordance with the illustrated embodiments of the invention, by apparatus of the type described which includes a body adapted to be connected to the end of the one member to be retrieved so that it may be moved with such one member into telescoping relation with respect to the other member, a carrier supported by the body and having a shoulder which is landable on a seat on the other member when said body has been moved into telescoping relation with respect to such other member, and latches supported by the carrier in position to be moved between unlatched position and latched position with respect to a latching shoulder on the other member when said carrier is landed. More particularly, means are provided on the body for moving the latches from unlatched to latched position and holding them in latched position and then locking the body against movement out of latch holding position, in response to manipulation of said one member, and then releasing said locking means to permit the body to be moved out of latch holding position, whereby the apparatus may be retrieved with said one member from the other member, in response to further manipulation of said one member.

Since the latches are effectively locked in latching position by other than the latching parts themselves, it is unnecessary that the shoulder on such other member be so prepared as to be slidably engaged by the latching part on the one member. On the other hand, the parts by which the body is locked in latch holding position may be, and preferably are, releasable upon sliding contact between them while the one member to be retrieved is held in tension, or while the weight thereof is slacked off, as in the above-described prior apparatus, whereby the body is adapted to be relocked with respect to the carrier, when released therefrom, merely in response to movement of the body back to latch holding position. However, since the locking parts are part of the retrievable apparatus, and thus are not exposed to damage or debris, as in the prior apparatus previously described, the fact that, in their preferred embodiments, they require relative sliding between their surfaces, while one member is held in tension, or the weight thereof is slacked off, does not create problems. Also, since the body is not locked until the latches are in latched position, the operator is assured that the one member is securely latched with respect to the other member before the locking parts are engaged.

Spring means acts between the body and the carrier to urge the carrier into a supported position on the body, and thus, as will be more fully understood from the description to follow, maintain the body in its first position with respect to the carrier as it is lowered into telescoping relation with respect to the other member. Additionally, the body is engageable with the carrier, upon movement into its second position with respect to the carrier, whereby the body is located in its locked position and the load of the one member may be transmitted to the other member.

As previously mentioned, the apparatus is particularly adaptable for latching the lower end of one member to the upper end of another, generally vertically disposed member. More particularly, and in accordance with the preferred embodiments of the invention, latching is responsive to manipulation of the one member from a remote location, as, for example, manipulation of a tubing string from the head of a well to move the string from its first to its second position.

In the illustrated embodiments of the invention, the locking means includes locking parts mounted on the carrier for rotation with it, and locking parts mounted on the body for rotation with it, such parts being releasable from locking engagement in response to rotation of the body with respect to the carrier upon the application of torque to the one member while the carrier is fixed against rotation with respect to the other member. In order to assure that the carrier is so fixed, the other member has a slot formed therein, and a finger is supported by the carrier in a position to move into the slot, when the shoulder is engaged with the seat and the finger is rotationally aligned with the slot, a spring means also being provided for urging the finger into the slot.

In one embodiment of the invention, the locking parts comprise threads on one of the body and carrier and circumferentially spaced-apart segments of a nut on the other of the body and carrier for threaded engagement therewith, the nut segments being yieldably urged toward threaded engagement so that the parts on the body and carrier ratchet past one another as the body continues to move with respect to the carrier following movement of the latching parts into latching position with respect to the latching shoulder of the other member. As in the aforementioned apparatus of this type, the body is released from the carrier upon rotation of the body with respect to the carrier while applying sufficient tension thereto to prevent ratcheting. In another embodiment of the invention, the locking parts comprise a pin fixed to one and a "J" slot in the other of the body and carrier, whereby the weight of the one member is slacked off as torque is applied thereto in order to move the pin into the channel through which it may be released from the slot.

Preferably, a means on the body holds the latches in unlatched position, as the body is lowered into telescoping relation with respect to the other member, and then moves the latches into and holds them in unlatched position upon raising of the body to release the locking means. Thus, the latches do not interfere with free telescopic movement of the body into or out of the other member, and the possibility of damage to the latches, as the apparatus is lowered toward or raised from telescoping relation with the other member, is reduced.

In the illustrated embodiments of the invention, the shoulder is formed in a vertically extending bore within the well conduit into which the lower end of the body is lowered, and the carrier is disposed about the body so that the latches are in position to be moved outwardly into the latching relation with respect to the shoulder.

Also, the body includes a tubular member on which the carrier is supported, and the lower end of the tubular member depends from the body so as to act as a stinger which moves telescopically into the bore beneath the groove. More particularly, a sleeve depends from the tubular member to surround the carrier and provide a space between it and tubular member in which the locking means is carried, and the body has a port through which grease may be introduced into the upper end of the space above the locking means so as to protect the locking parts against the intrusion of mud or other debris. Lowering of the body including the tubular member and sleeve has a piston effect to force the grease through the locking parts and thus remove the debris therefrom.

When the apparatus forms a part of a well installation in which it is connected to the lower end of a tubing string for latching the tubing string to the upper end of a well conduit, a means is also provided for sealing between the body and the other member when the apparatus is so latched. This sealing means, which is carried about the stinger portion at the lower end of the tubular member of the body to form a sealed joint with the bore of the well conduit, comprises seal rings of elastomeric material fittable within circumferential grooves formed in the cylindrical surface of the stinger portion opposite the cylindrical surface of the bore. More particularly, each seal ring has a recess in its outer side intermediate annular lips which protrude from the cylindrical surface for sealing engagement with the other cylindrical surface, and a clamp which is of a size to fit within the recess of the seal ring intermediate the lips thereof is made of a relatively rigid material which is radially distortible from an initial shape, in which its inner diameter is free to move axially of the stinger into a position opposite the recess, into a shape in which it fits tightly about the groove to secure the seal ring therein. Seal rings assembled in this manner will be retained within the groove without bonding. Also, the member on which they are assembled need not be threaded to receive a similarly threaded retainer nut.

In the drawings, wherein like reference characters are used throughout to designate like parts.

With reference now to the details of the above-described drawings, the embodiment of the apparatus shown in FIGS. 1 to 6, and indicated in its entirety by reference character 20, is connected to the lower end of a tubing string (not shown) for latching it in telescopic relation within the upper end of a generally vertically disposed well conduit 23. As well known in the art of drilling and completing oil and gas wells, conduit 23 may be a tubing head located at the mud line of an offshore well installation, and the tubing string may be suspended from a wellhead at the water surface. In a well installation of this type, the operator must be able to latch and unlatch the lower end of the string with respect to the well conduit 23 in response to manipulation of the tubing string at the wellhead, which may be a considerable distance above the mudline.

As previously described, and as shown in the drawings, the apparatus comprises a body 21 which includes a tubular member 24 having an upper end adapted to be connected to the tubing string, and a lower end 25 which is adapted to stab into the bore 22 of the well conduit. More particularly, the lower end 25 of the tubular member carries seal rings S thereabout to seal against bore 22 when the apparatus is latched in telescoping relation with respect to the well conduit. Thus, the lower end of the tubular member acts as a stinger both to provide sealed joints between the tubing string and well conduit forming a continuation of the flow passage therethrough.

The body 21 also includes a sleeve 24A which surrounds the tubular member 24 to form an annular space therebetween in which an annular carrier 26 supported by the body 21 is disposed. The carrier has a shoulder 27 on its lower end which depends from the lower end of the sleeve 24A to land on a seat 28 on the upper end of the well conduit, as the lower end 25 of the tubular member stabs into the bore of the well conduit. Latches in the form of fingers 29 are supported by the carrier intermediate the tubular member 24 and the carrier 26 so as to dispose radially enlarged latching parts 29A on their lower ends opposite a recess 30 formed about the bore of the well conduit when the carrier is landed on the well conduit, as shown in FIG. 2.

Figure 1:
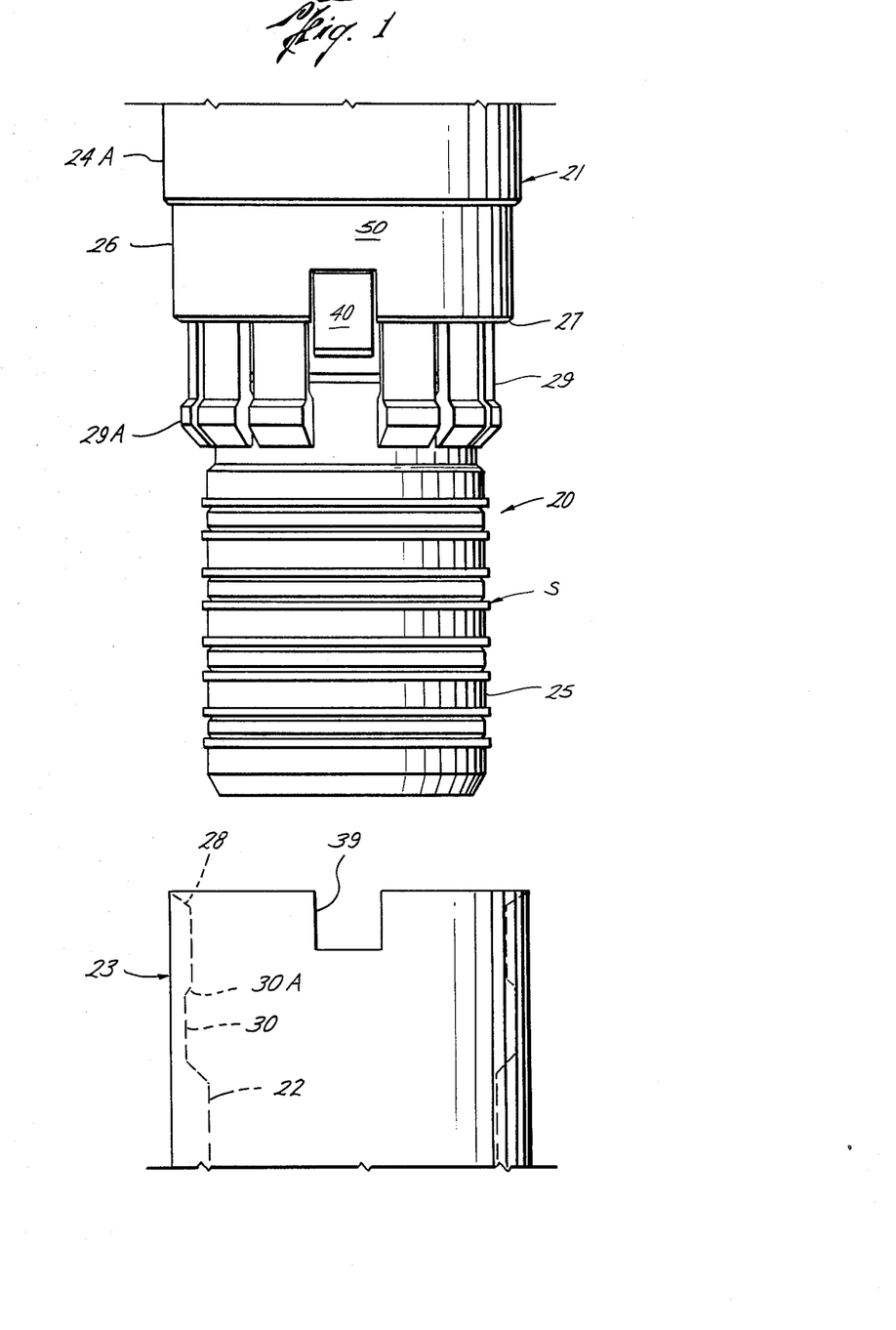
FIG. 1 is an elevational view of apparatus constructed in accordance with the first described embodiment of the invention, as the lower end of a tubing string to which the apparatus is connected is lowered toward telescoping relation within the upper end of a well conduit.
Figure 2:
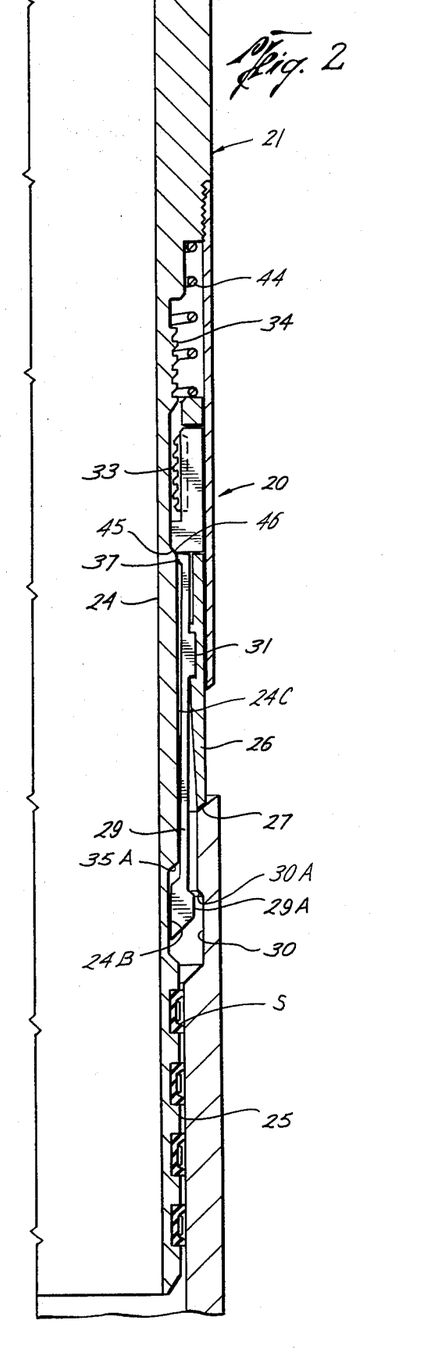
FIG. 2 is a vertical half sectional view of the apparatus of FIG. 1 upon further lowering of the tubing string to move the body of the apparatus into telescoping relation within the bore of the well conduit and land a shoulder on the carrier thereof on a seat of the well conduit to locate latches supported on the carrier opposite a groove within the well conduit.
Figure 3:
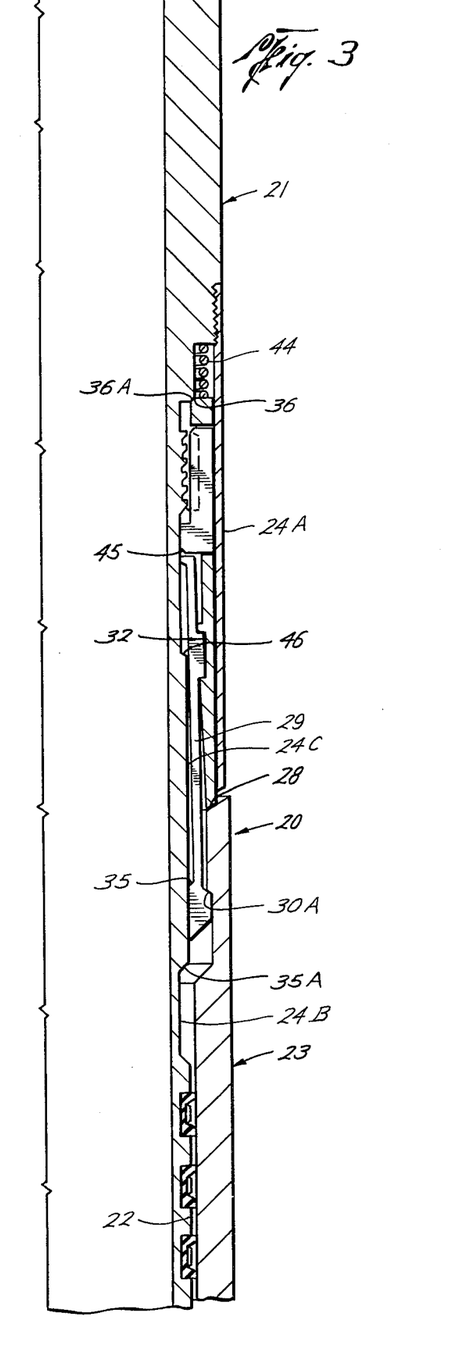
FIG. 3 is a half sectional view of the apparatus similar to FIG. 2, but upon lowering of the body with respect to the carrier so as to move the latches into latching positions within the groove of the well conduit and lock the body against upward movement with respect to the carrier.

Ribs 31 on the outer sides of the latch fingers fit within a recess 32 on the inner diameter of the carrier to permit the latching parts 29A on their lower end to be swung between the radially inner, unlatching positions of FIG. 2 in which they are removed from beneath a shoulder 30A on the upper end of recess 30, and the radially outer, latching positions of FIG. 3 in which they are beneath the shoulder. In order to accommodate this swinging movement of the fingers, the inner diameter of the lower end of the carrier beneath recess 32 is flared outwardly, and the upper end of the carrier above the recess has an enlarged inner diameter.

Locking parts in the form of circumferentially split segments 33 of a nut are mounted on the carrier 26 above the latches for movement radially with respect thereto between an inner position in which they threadedly engage threads 34 on the outer diameter of the tubular member of the body, as shown in FIG. 3, and an outer position in which they permit the threads 34 to move downwardly thereover. When the nut segments are yieldably urged into threaded engagement with the threads 34 of the body, in a manner to be described, they prevent the body from being moved upwardly with respect to the carrier other than in response to rotation of the body with respect to the carrier, as will also be described to follow. On the other hand, the nut segments are free to move outwardly to permit threads 34 to ratchet over the threads on the nut segments, as the body moves downwardly with respect to the carrier from the position of FIG. 2 to the position of FIG. 3. Downward movement of the body is limited by a shoulder 36 on the body which engages a shoulder 36A on the carrier to prevent threads 34 from ratcheting past the nut segments, and also permit the weight of the body and thus the weight of the tubing string to be transmitted through the carrier to the well conduit.

As the carrier 26 is lowered toward landed position on the well conduit, as shown in FIG. 2, the body 21 is held in a first vertical position with respect to the carrier by means of a coil spring 44 within the annular space between the tubular member and sleeve. Thus, the spring acts between the body and the carrier to urge a shoulder 45 on the carrier into engagement with a seat 46 on the tubular member 24. As previously described, in this first vertical position of the body with respect to the carrier, the radially enlarged latching parts 29A on the lower ends of fingers 29 are disposed opposite recess 30, whereby shoulders on the upper ends of such parts may be swung outwardly beneath shoulder 30A on the upper end of the recess.

A recess 24B is formed in the outer diameter of the tubular member to receive the inner sides of the enlarged locking parts 29B in their unlatching positions of FIG. 2. The outer diameter of the tubular member above recess 24B and below shoulder 46 thereon provides a cam surface 24C which, in the raised position of the body with respect to the carrier (FIG. 2), engages flanges 37 disposed about the upper ends of the fingers 29 so as to urge the latching parts 29A into the recess, and thus into unlatching positions in which the latching parts are free to move through the upper end of the well conduit. At the same time, the threads 34 about the tubular member are spaced above the threads on the inner diameters of the nut segments 33, and thus out of locking engagement therewith.

With the carrier landed on the well conduit so as to position the latching parts opposite the recess 30, the weight of the tubing string may be slacked off so as to move the body 21 downwardly with respect to the landed carrier, and thus with respect to the latching fingers supported by the carrier. During the initial phase of this downward movement of the body, the upper end of the cam surface 24C about the tubular member will have moved below the flanges 37 on the upper ends of the fingers 29 so as to permit the locking parts to swing outwardly. Upon continued downward movement of the body, a shoulder 35A at recess 24B engages a shoulder 35 on the latching 29A to swing the latching parts 29A outwardly into the recess 30, and thus into latching position beneath shoulder 30A. With the latching parts so positioned, the cam surface 24C about the tubular member will slide along their inner sides to hold them outwardly in latching position, as shown in FIG. 3.

Preferably, the vertical spacing between the shoulders 35 and 35A is less than the vertical spacing between threads 34 and the threads on the inner sides of the nut segments 33, so that the latching will be moved into latching position before the lower ends of threads 34 begin to ratchet over the upper threads of the nut segments 33. Furthermore, since the cam surface 24B of the tubular member extends a substantial distance above the recess 24B, it will continue to hold the latching parts in latching position as the threads 34 ratchet over the threads on the nuts 33 to move into full locking engagement therewith, as shown in FIG. 3. At this time, the above described downwardly facing shoulder 36 on the outer diameter of the tubular member will have landed on an upwardly facing shoulder 36A on the upper end of the carrier so as to prevent further downward movement of the body with respect to the carrier.

Assuming that the threads 34 and threads on the inner surfaces of the nut segments 33 are lefthand, the body of the apparatus may be released from locking engagement with the carrier, whereby the body 22 may be raised from the position of FIG. 3 back to the position of FIG. 2, by the application of righthand torque to the string as the string is held in tension. As the threads 34 disengage from the nut segments, the tension on the tubing string will prevent reratcheting of threads 34 over the nut segments and then, upon release, lift body 22 with respect to the carrier, which is still latched to the well conduit, so as to raise shoulder 35A above shoulder 35 on latching parts and thereby free them for movement into unlatching positions. More particularly, continued lifting of the body 21 will cause the cam surface 24C about the outer diameter of the tubular member to move within flanges 37 on the upper ends of the latching fingers in order to swing them into and hold them in unlatched positions. At this time, shoulder 46 on the tubular member will have been raised into engagement with shoulder 45 of the carrier to permit the carrier to be lifted from the well conduit with the body 22.

There may not be sufficient frictional contact between the latching parts and the latches on shoulder 30A to prevent rotation of the carrier with the body during the above-described release of the body from locking engagement with the carrier. Thus, a pair of slots 39 are formed in the upper end of the well conduit to receive the lower ends of locking dogs 40 which are supported by the carrier intermediate certain of the latching fingers 29. More particularly, the groove 32 about the inner diameter of the carrier also receives ribs 41 about the outer surface of the dogs 40 (see FIG. 4) so as to permit the lower ends of the dogs to be swung into and out of the slots 39, when the lower ends of the dogs are rotationally aligned with the slot.

Figure 4:
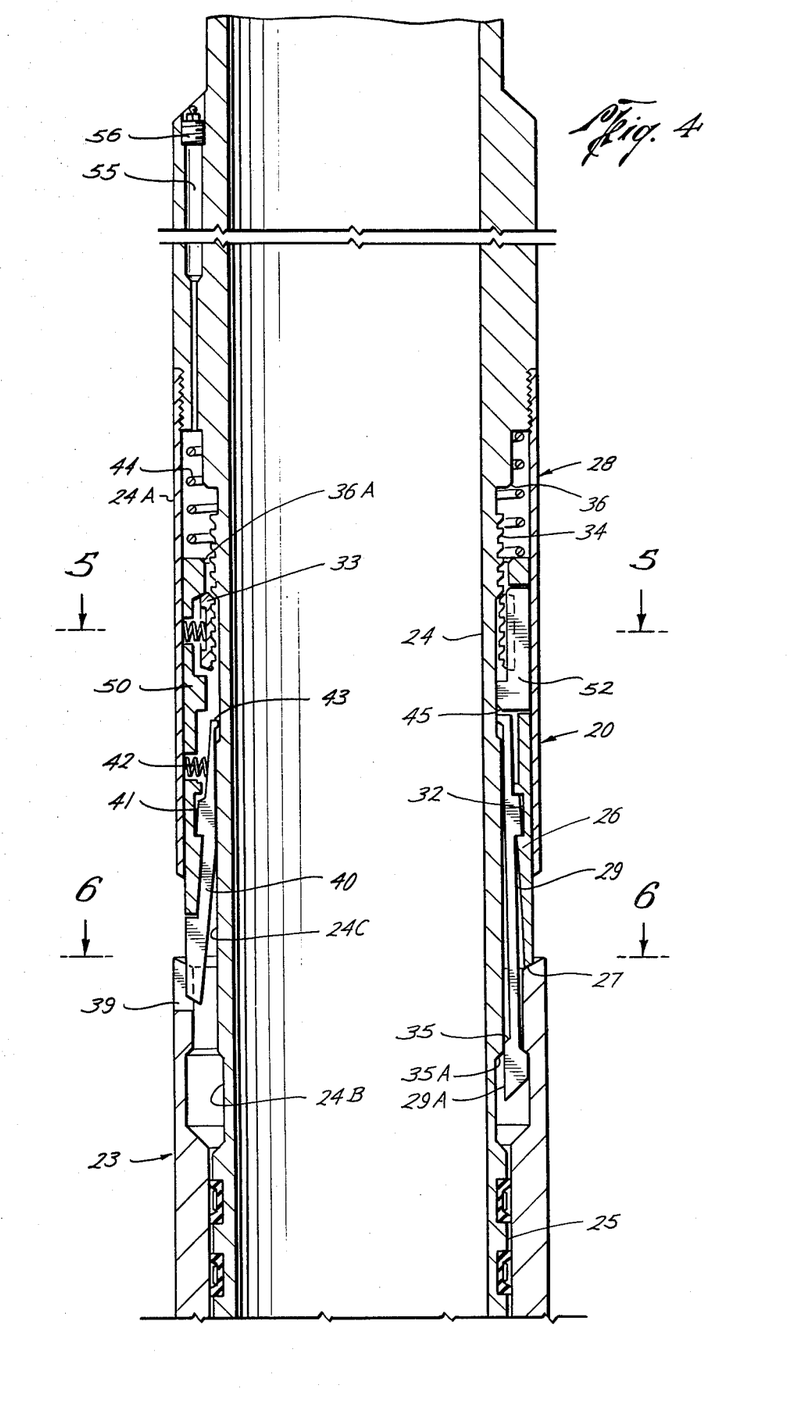
FIG. 4 is a full vertical sectional view of the apparatus of FIGS. 1 to 3, as seen along broken lines 4—4 of FIG. 5, and rotation of the tubing string to unscrew the body from the carrier, whereby it may be lifted with respect thereto in order to move the latches to unlatched position and thus permit the apparatus to be retrieved.

As in the case of the latching fingers, the tapered inner side of the carrier above and below groove 32 is so shaped as to accommodate swinging of the dogs into and out of the slots. As shown in FIG. 4, the lower ends of the dogs 40 are urged outwardly by means of coil springs 42 acting between the upper ends of the dogs and sleeve 24A of the body, so that the lower ends of the dogs will automatically move into the slots 39 when rotationally aligned therewith.

As the operator applies torque to the tubing string to rotate the body in order to release it from the carrier, dogs 40 will rotate with the carrier until such time that their lower ends are opposite the slots, and then move into the slots (see FIG. 4) to prevent further rotation of the carrier with the body, whereby continued rotation of the body will release the locking engagement of threads 34 with nut segments 33.

As a correlary to the fact that the body is not locked to the carrier until the latches have moved to latching position, the body is not released from the carrier until the latches are free to move to unlatching position. Thus, as shown in FIG. 4, the lower end of the cam surface 24C about the tubular member is still engaged with the inner sides of the latching parts 29A of the latching fingers even though the threads 34 have disengaged from the threads of nut segments 33. Thus, the latches will not be unlatched until the body is lifted further with respect to the carrier to the position of FIG. 2, to raise the lower end of the cam surface about the tubular member above the inner sides of the latching parts 29A.

The body may be relocked to the carrier, when released therefrom, and the threads 34 may be fully engaged with the threads of the nut segments 33, following partial disengagement therewith, without unlatching the apparatus from the well conduit. Still further, even if the body is raised with respect to the carrier to the position shown in FIG. 2, so as to move latching parts inwardly to unlatching position with respect to the well conduit, the apparatus may be relatched by again lowering the body with respect to the carrier to the position of FIG. 3. In fact, the apparatus may be so relatched even if it has been lifted to raise the lower end of the carrier from its landed position on the well conduit.

Figure 5:
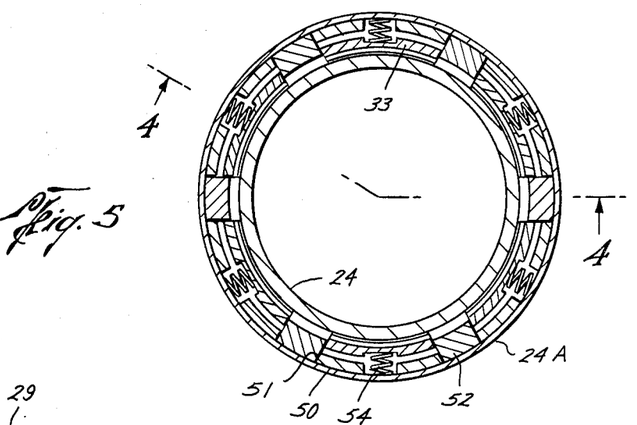
FIGS. 5 and 6 are cross-sectional views of the embodiment of the apparatus above described, as seen along broken lines 5—5 and 6—6, respectively, of FIG. 4.
Figure 6:
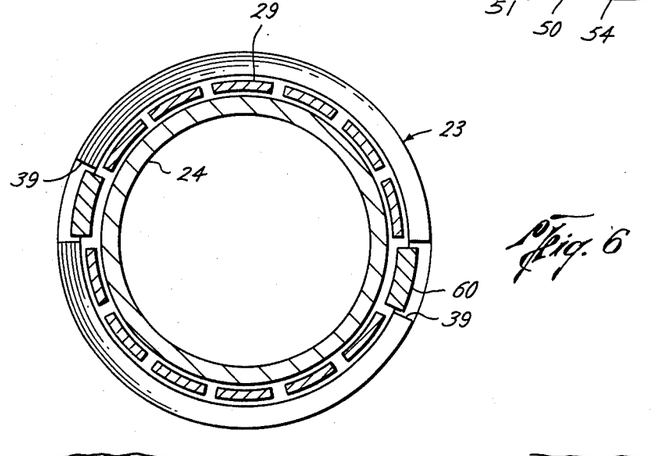

As shown in FIG. 4, 5, and 6, the carrier 26 is made up of an outer ring 50 in which circumferentially spaced-apart slots 51 are formed to receive spacers 52. When so positioned, the spacers are secured to the outer ring and extend radially inwardly beyond the ring 50, and nut segments 33 are received between the opposite sides of the spacers for movement between a radially outer position and the radially inward position of FIG. 4. In this radially inward position, wherein their opposite sides engage those of the spacers to limit further inward movement, the threads on the nut segments 33 will threadedly engage the threads 34 without undue inwardly disposed radial force. The nut segments are urged to their inner positions by means of coil springs 54 acting between the sleeve 24A and the outer surfaces of the nut segments, the springs of course providing a force which yields when the weight of the tubing string is slacked off.

As shown in FIG. 4, a passageway 55 formed in the tubular member 24 connects the exterior thereof with the upper end of the annular space between the tubular member and the sleeve 24A of the body. More particularly, the passageway 55 extends vertically within an enlarged diameter portion of the tubular member above this space, and a grease fitting 56 is mounted in the upper end of the passageway to permit grease to be pumped into the annular space above carrier 26 and locking parts 33 mounted thereon. Although the carrier and locking parts occupy a large amount of the cross-sectional area of the annular space, the grease may be pumped therethrough and into the lower end of the space so as to provide a barrier space entry of the debris which might otherwise interfere with the proper functioning of the locking means. Furthermore, as the body is moved downwardly with respect to the carrier from the position of FIG. 2 to the position of FIG. 3, the portion of the body which forms the upper end of the space will have a pumping effect on the grease so as to cause it to be moved through and thus flush the threads of the locking means.

The other embodiment of the apparatus, which is illustrated in FIGS. 7 to 9 and FIGS. 7A to 9A, and which is indicated in its entirety by reference character 60, is very similar to the embodiment above described, and, in fact, differs therefrom only in the construction and operation of the means for releasably locking the body of the apparatus against upward movement with respect to the carrier thereof. Thus, the apparatus includes a body 61 having a tubular member 62 whose upper end is adapted to be connected to a tubing string and whose lower end has seal rings S carried thereon and adapted to be stabbed into the bore of a well conduit 67 to form a sealed joint therewith, and a sleeve 62A suspended from and disposed about the tubular member to provide an annular space between them.

Figure 7:
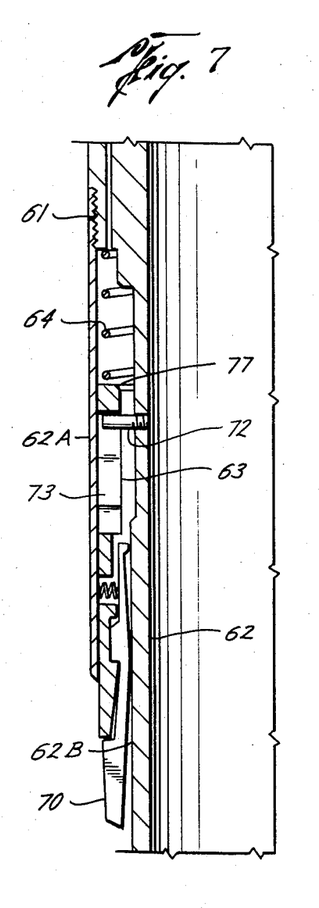
FIG. 7 is a vertical half sectional view of apparatus constructed in accordance with another embodiment of the invention, and showing the carrier thereof supported from the body thereof.
Figure 7A:
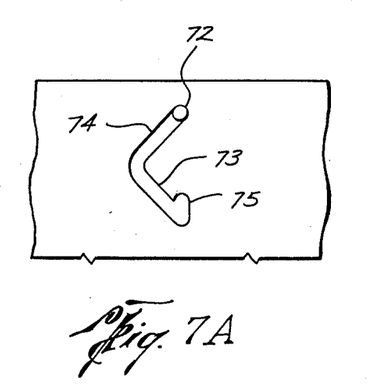
FIGS. 7A, 8A and 9A are vertical sectional views of the apparatus of FIGS. 7 to 9, showing the relative locations of the pin and slot in the positions of the body and carrier shown in FIGS. 7, 8, and 9, respectively.

The carrier 63 of the apparatus is received within the annular space and supported from the body, as the body is lowered into telescoping relation within the well conduit. Furthermore, the carrier is yieldably urged downwardly into its supported position on the body by means of a coil spring 64 acting between the tubular member and the upper end of the carrier within the annular space.

Figure 8:
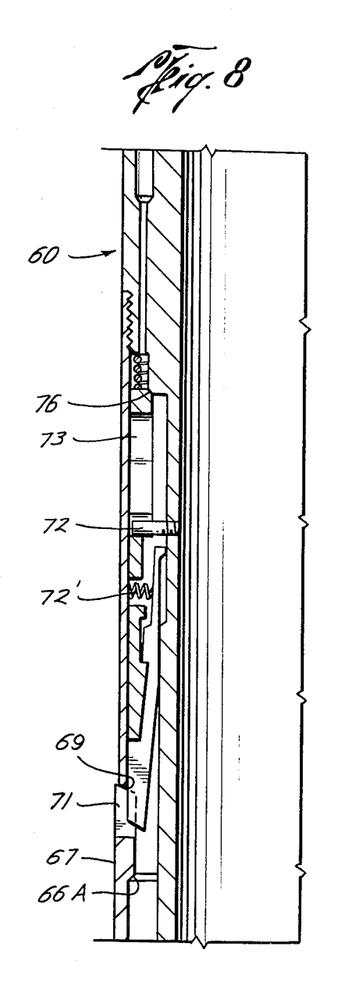
FIG. 8 is another half sectional view of the apparatus of FIG. 7, but with the carrier thereof landed on the well conduit to dispose the lower end of the body telescopically within the bore, and the body lowered with respect to the carrier to move the latches supported on the carrier into latching position and lock the body against upward movement with respect to the carrier.

As was also true of the first-mentioned embodiment, latching fingers 65 are supported within the annular space on the inner diameter of the carrier, for swinging between unlatching positions and a latching position in which radially enlarged latching parts 65A on their lower ends are disposed beneath a shoulder 66A on the upper end of a recess in a recess 66 in the upper end of the bore of the well conduit. In order to move the latches into latching position, a shoulder 68 on the lower end of the carrier is lowered onto a shoulder 69 about the upper end of the well conduit in order to position the latching parts opposite the recess 66, and the body is lowered with respect to the carrier so as to move the latching parts outwardly into latching position and hold them in such position. More particularly, and as will be described to follow, the body is lowered further in order to lock the body against upward movement with respect thereto.

As was also true of the first-mentioned embodiment of the invention, dogs 70 are supported by the carrier for swinging movement between positions in which their lower ends move into and out of slots 71 in the upper end of the well conduit. More particularly, the lower ends of the dogs are yieldably urged outwardly toward the slots, so as to move into the slots when rotationally aligned therewith, by means of coil springs 72'. As in the first-described embodiment, the latching fingers as well as the dogs are swingably supported from the inner diameter of the carrier in the same manner - i.e., by means of ribs about their outer sides which are received within a groove about the inner diameter of the carrier.

The means by which the carrier is supported from the body and the body may be releasably locked against upward movement with respect to the carrier, when lowered with respect thereto, comprises one or more pins 72 extending outwardly from the tubular member for guided movement within "J" slots 73 formed in the carrier above the latching fingers and dogs, and thus generally in the same vertical location with respect to the body and carrier as the threads 34 and nut segments 33 of the first-described embodiment. Each slot includes a downwardly extending, relatively long channel 74 having a lower end connected to an upwardly extending, relatively short channel 75, the pin being adapted to be moved from the upper end of the channel 74 to its lower end, and then upwardly into the upper end of the channel 75, as the body is lowered with respect to the carrier from the position of FIG. 7 to that of FIG. 8, and then raised with respect thereto from the position of FIG. 8 to that of FIG. 9. When disposed in this latter position, the pin prevents the body from moving upwardly, or from rotating out of the channel 75 into the channel 74.

When the pin 72 is in the upper end of channel 74, as shown in FIG. 7, it supports the carrier with respect to the body as the body is lowered into telescoping relation within the bore of the well conduit. Then, when the carrier is landed on the well conduit, and the weight of the tubing string is slacked off to lower the body with respect to the carrier, pin 72 moves downwardly within the channel 74 from the upper end thereof to the lower end. In this respect, channel 74 is of such length that when pin 72 reaches its lower end, body 62 will be in substantially the same vertical position with respect to the carrier as is the body with respect to the carrier in the apparatus shown in FIG. 3. Thus, the latching parts will have moved into the latching position shown in FIG. 9, and held in such position by cam surface 62B about the outer diameter of the tubular member. Also, a shoulder 76 on the tubular member will have moved into seating engagement with a shoulder 77 on the upper end of the carrier so as to permit the weight of the tubing string to be transmitted through the well carrier to the well conduit, as in the case of the first-described embodiment. At this time, although the pin 72 will be in the lower end of the channel 74, and thus in a position to move upwardly into the upper end of channel 75, it will not have contacted the lower end of the channel 74, and thus will not interfere with seating of shoulder 76 upon shoulder 77.

Figure 8A:
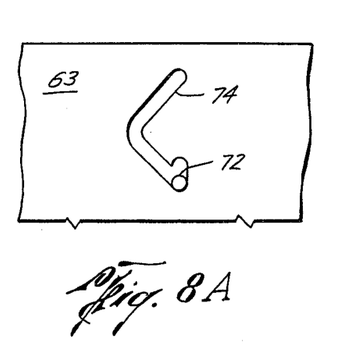

As shown in FIGS. 7A to 9A, the channel 74 of the slot has an upper portion which tapers downwardly to the left and a lower portion which tapers downwardly to the right, its upper and lower ends being generally vertically aligned. Consequently, as the weight of the tubing string is slacked off, movement of the pin within the upper portion of the slot will impart some torque to either the tubular member or to the carrier, depending on whether or not the locking dogs of the carrier are engaged within the slots 71 of the well conduit. In any event, due to the close fit of the pin 72 within the slot 73, this torque will be effective to urge the pin into the lower end of the channel 74 as the pin moves into the lower portion of the channel.

Figure 9:
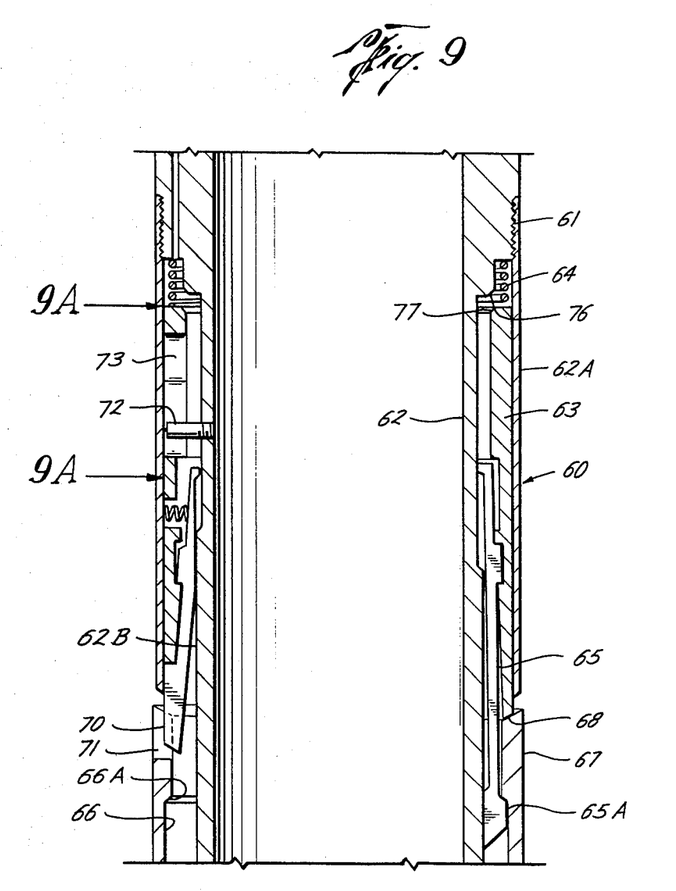
FIG. 9 is a full sectional view of the apparatus of FIGS. 7 and 8, but with the body raised with respect to the carrier to move a pin carried thereby into a locking channel of a slot in the carrier in order to prevent the body from being lifted from the well conduit.
Figure 9A:
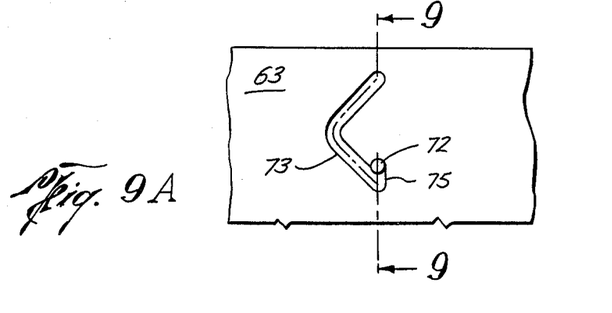

After completion of the downward movement, any subsequent upward urging of the body 61 will be resisted as the pin 72 moves into the position as shown in FIG. 9A. In order to release the body from locking engagement with the carrier, the weight of the tubing is slacked off to move the body down until shoulder 76 lands on shoulder 77. At this time, pin 72 is in the lower end of channel 74 so that the tubing string may be lifted as righthand torque is applied thereto in order to lift pin 72 into the upper end of channel 74 and thereby disengage the body from the carrier.

Figure 10:
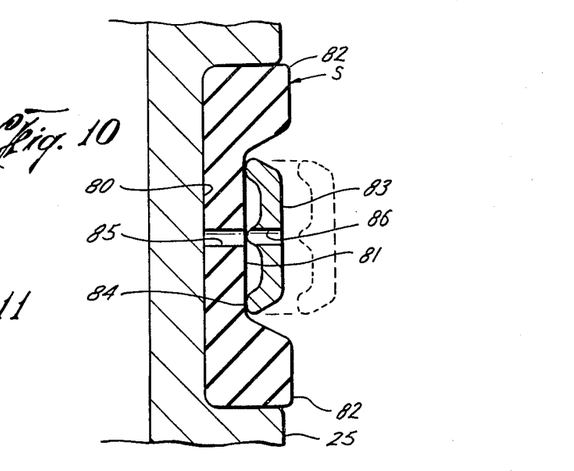
FIG. 10 is an enlarged vertical sectional view of a seal ring mounted on the stinger portion on the lower end of the body in accordance with one embodiment of the invention.

Seal rings, which are closely received within grooves 80 formed in the outer diameter of the stinger portion on the lower end of the tubular member of the body, are made of a suitable elastomeric material having a recess 81 about its outer side intermediate annular lips 82 about its upper and lower ends. The lips protrude from the outer diameter of the tubular member a distance which causes them to tightly engage and thus seal against the inner diameter of the bore of the well conduit as the lower end of the tubular member moves into the bore.

The seal ring is retained within groove 80 by means of a clamp ring 83 which is of such width from its upper to its lower end as to fit within and clamp tightly about the recess in the seal ring so as to retain it in the groove. The clamp ring is made of a metal which is circumferentially compressible from an initial shape which, as shown in broken lines in FIG. 10, permits it to be moved axially over the lower end of the tubular member and thus into a position laterally opposite the recess, into a shape in which, as shown in solid lines in FIG. 10, it fits tightly about the recess in the seal ring. The selection of a suitable metal for this purpose will be obvious to a person skilled in the art, as will be the selection of suitable tools for radially compressing the clamp ring.

Preferably, ribs 84 are formed on the inner side of the clamp ring in order that the clamping force may be concentrated along small areas at the upper and lower ends of the recess. The space between the bottom of the recess and the inner side of the clamp ring, and the space between the ends of the recess and the ends of the clamp ring, permit the seal ring to swell. The clamp ring is, of course, of such thickness that, when clamped within the recess, its outer diameter does not project from the outer cylindrical surface of tubular member 24, and thus does not interfere with the free movement of the lower end of the tubular member into a position within the bore of the well conduit.

The seal ring S is permitted to breath, in the event fluid accumulates behind the inner side of the seal ring. Thus, one or more holes 85 are formed therein to connect its inner side with the space between the inner side of the clamp ring and the bottom of the recess 81, and the clamp ring 83 has one or more holes 86 formed in it to connect this space with its outer side.

Figure 11:
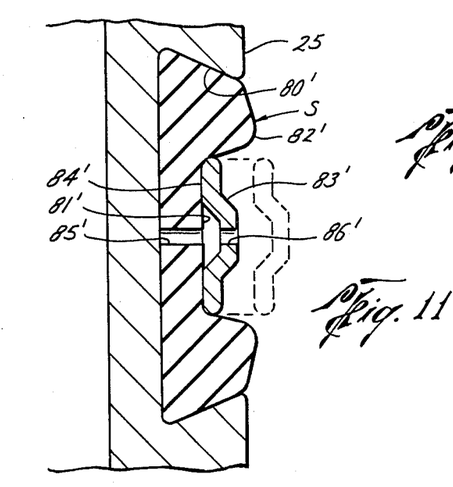
FIG. 11 is an enlarged, vertical sectional view of a seal ring mounted on such portion of the above in accordance with another embodiment of the invention.

The alternative embodiment of the seal ring, which is illustrated in FIG. 11 and indicated in its entirety by reference character S', fits closely within a groove 80' in the tubular member which is dovetailed in cross section to assist in holding the seal ring within the groove. Also, the lips 82' about the upper and lower ends of the seal ring have surfaces which converge in a radially outward direction from upper ends which are adjacent to the intersection of the recess with the cylindrical surface of the tubular member. Thus, the upper lip is intended to seal against a predominant pressure acting in an upward direction, and the lower lip is intended to seal against a predominant pressure acting in a downward direction. This is of advantage, for example, as the stinger portion of the lower end of the tubular member of the body is lifted from telescoping relation within the bore of the well conduit, because it permits a predominant pressure acting in an upward direction to be unloaded as soon as the upper lip moves past the upper edge of the bore beneath groove 30.

The clamp ring 83' if of a material which permits it to function in generally the same manner as the clamp ring 83 of the embodiment of FIG. 10. That is, it is radially compressible from an initial shape which permits it to be moved axially over the end of the tubular member into a position opposite the recess 81, and into a shape in which it is clamped tightly about the bottom of the recess in the seal ring so as to retain it within the groove of the tubular member.

Also, as in the case of the first-described embodiment, the inner diameter of the clamp ring has ribs 84 formed thereon which engage the recess in the seal ring toward its upper and lower ends. Also, one or more holes 85' formed in the seal ring S to connect its inner diameter with the space between the inner side of the clamp ring and the bottom of the recess 81', and the clamp ring 83 has one or more holes 86' formed in it to connect the space with its outer side.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Apparatus for latching the end of one member to the end of another member which has a latching shoulder thereon facing away from said end, comprising a body connectible to the end of the one member and adapted to be moved into telescoping relation with respect to the end of the other member, latching means supported by the body, including a carrier and latches supported by the carrier for movement from unlatched to latched position with respect to the latching shoulder, when said body is so telescopically related with respect to the end of said other member, said body being movable in one vertical direction with respect to said latching means into a position for holding said latches in latched position, said body and latching means having means thereon for preventing movement of said body in the opposite vertical direction and out of holding position, and thus locking the body in latch holding position, and said locking means being releasable in response to rotation of the body to permit the body to be moved in said opposite vertical direction and out of latch holding position, whereby the latches are free to move into unlatched position to permit the apparatus to be moved with said one member out of telescoping relation with said other member.

2. Apparatus of the character defined in claim 1, wherein said locking means includes parts on the body and carrier whose release requires rotation of said body with respect to said carrier to cause said parts to slide over one another.

3. Apparatus of the character defined in claim 2, wherein said locking parts are operable, upon release, to relock the body in latch holding position.

4. Apparatus of the character defined in claim 1, wherein said body includes a space in which said locking means is carried and a port through which grease may be introduced into the space.

5. Apparatus of the character defined in claim 1, wherein the latches occupy their unlatching position as they are moved past the end of the other member into and out of positions opposite the latching shoulder thereof.

6. Apparatus of the character defined in claim 5, wherein the latches comprise fingers which are supported by the carrier for pivoting between latched and unlatched positions.

7. Apparatus of the character defined in claim 1, including spring means acting between the latching means and the body to yieldably retain said latches in unlocked position and said locking means in locking position.

8. Apparatus of the character defined in claim 2, including means on the latching means engageable with said other member, as said body is moved into telescoping relation with respect to the end thereof, in order to prevent rotation therebetween.

9. Apparatus for latching the end of one member to the end of another member which has a seat thereon facing said end and a latching shoulder thereon facing away from said end, comprising a body connectible to the end of the one member and adapted to be moved into telescoping relation with respect to the end of the other member, latching means supported by the body, including a carrier and latches supported by the carrier, and means engageable with the seat, as said body is moved into such telescoping relation, to locate said latches in position for movement from unlatched to latched position with respect to the latching shoulder, said body having means thereon which is movable in response to movement of the body in one vertical direction with respect to said latching means into a position for holding said latches in latched position, said body and latching means having means thereon for preventing movement of said body in the opposite vertical direction and movement of the holding means out of holding position, and thus locking the holding means in latch holding position, and said locking means being releasable in response to rotation of the body to permit the holding means of the body to be moved in the opposite vertical direction out of latch holding position, whereby the latches are free to move into unlatched position to permit the apparatus to be moved with said one member out of telescoping relation with said other member.

10. Apparatus of the character defined in claim 9, wherein said locking means includes parts on the body and carrier whose release requires rotation of said body with respect to said carrier to cause said parts to slide over one another.

11. Apparatus of the character defined in claim 10, wherein said locking parts are operable, upon release, to relock the body in latch holding position.

12. Apparatus of the character defined in claim 9, wherein said body includes a space in which said locking means is carried and a port through which grease may be introduced into the space.

13. Apparatus of the character defined in claim 5, wherein the latches occupy their unlatching position as they are moved past the end of the other member into and out of positions opposite the latching shoulder thereof.

14. Apparatus of the character defined in claim 13, wherein the latches comprise fingers which are supported by the carrier for pivoting between latched and unlatched positions.

15. Apparatus of the character defined in claim 9, including spring means acting between the latching means and the body to yieldably retain said latches in unlocked position and said locking means in locking position.

16. Apparatus of the character defined in claim 10, including means on the latching means engageable with said other member, as said body is moved into telescoping relation with respect to the end thereof, in order to prevent rotation therebetween.

17. Apparatus for latching the end of one member to the end of another member which has a seat thereon facing away from said end, comprising a body connectible to the end of the one member and adapted to be moved into telescoping relation with respect to the end of the other member, latching means supported by the body, including a carrier and latches supported by the carrier, said carrier being engageable with the seat, as said body is moved into such telescoping relation, to locate said latches in position for movement from unlatched to latched position with respect to the latching shoulder, said body having means thereon movable into a position for holding said latches in latched position in response to axial movement of said body in one direction with respect to said carrier, and locking parts on the carrier for locking engagement with locking parts on the body to prevent movement of the body in the opposite axial direction and out of latch holding position and thus locking said holding means in latch holding position, said locking parts being releasable in response to rotation of the body to permit said body to be moved axially in the other direction to move the holding means out of latch holding position, whereby the latches are free to move into unlatched position to permit the apparatus to be raised with said one member out of telescoping relation with said other member.

18. Apparatus of the character defined in claim 17, wherein the release of said locking parts requires rotation of said body with respect to said carrier to cause said parts to slide over one another while said carrier is fixed against rotation with respect to said other member.

19. Apparatus of the character defined in claim 18, including a finger supported by the carrier in a position to move into a slot in the other member when the carrier engages the seat and the finger is rotationally aligned with the slot, and a spring means which urges the finger into the slot.

20. Apparatus of the character defined in claim 18, wherein the locking parts comprise threads on one of the body and carrier and circumferentially spaced segments of a nut on the other of the body and carrier for threadedly engaging said threads, and means yieldably urging the segments toward threaded engagement with the threads.

21. Apparatus of the character defined in claim 18, wherein said locking parts are operable, upon release, to relock the body in latch holding position.

22. Apparatus of the character defined in claim 18, including spring means acting between the body and carrier to urge the carrier into supported position on the body.

23. Apparatus of the character defined in claim 18, including means on the body engageable with the carrier to support the body from the carrier when the carrier is engaged with the seat of said other member, whereby the load of the one member may be transmitted to the other member.

24. Apparatus of the character defined in claim 18, including means on the body for holding the latches in unlatched position as the body is moved into telescoping relation with respect to the other member, and for moving the latches from latched to unlatched positions and holding them in unlatched positions upon movement of the body out of latch holding position.

25. Apparatus of the character defined in claim 18, wherein the body includes a tubular member from which the carrier is supported, sleeve depending from the tubular member to provide a space therebetween in which said locking means is carried, and a port through which grease may be introduced into the upper end of the space above the locking means.

26. For use in a well installation, comprising an upstanding well conduit having an upwardly facing seat about its upper end and a bore therein having a downwardly facing shoulder thereabout, and a tubing string having a lower end adapted to be latched to and in generally coaxial relation with the bore of the well conduit; apparatus including a body connectible to the lower end of the tubing string and adapted to be lowered with said tubing string into telescoping relation within the bore of the well conduit, latching means including a carrier disposed about and supported by the body in position to land on the seat to locate said body in a first telescoping position within the bore of the well conduit, latches supported by the carrier for movement from unlatched to latched position with respect to said latching shoulder when the body is in its first telescoping position, means on the body movable into a position for holding said latches in latched position, in response to lowering of said body with respect to the carrier from its first toward a second telescoping position with respect to the carrier, and means for locking the body against upward movement with respect to the carrier in order to maintain the holding means in latch holding position, as said body is lowered further into its second telescoping position, said locking means being releasable in response to the application of torque to the body to permit the body to be raised from its second back toward its first telescoping position in order to free the latches for movement out into unlatched position, whereby the tubing string may be raised from said well conduit, and means for sealing between said body and said well conduit.

27. Apparatus of the character defined in claim 26, wherein said locking means includes parts on the body and carrier whose release requires rotation of said body with respect to said carrier to cause said parts to slide over one another.

28. Apparatus of the character defined in claim 27, wherein said locking parts are operable, upon release, to relock the body in latch holding position.

* * * * *